Sept. 30, 1969     A. W. T. MOTTRAM     3,470,398
GENERATING DUCT FOR A MAGNETOHYDRODYNAMIC ELECTRICAL GENERATOR
Filed July 12, 1967     3 Sheets-Sheet 1

INVENTOR:-
ANTHONY WILLIAM THOMAS MOTTRAM

United States Patent Office 3,470,398
Patented Sept. 30, 1969

3,470,398
GENERATING DUCT FOR A MAGNETOHYDRODYNAMIC ELECTRICAL GENERATOR
Anthony William Thomas Mottram, 9 Fosse Way, Princethorpe, Warwickshire, England
Filed July 12, 1967, Ser. No. 652,975
Claims priority, application Great Britain, July 15, 1966, 31,793/66
Int. Cl. G21d 7/02
U.S. Cl. 310—11                          6 Claims

ABSTRACT OF THE DISCLOSURE

Method of manufacturing a generator duct for a magnetohydrodynamic (MHD) generator by sealingly securing together end-to-end alternate electrode-defining, annular, tubular members and annular layers of insulation. The method includes the first step of assembling a pack of alternate templates and template separators forming a laminated block having a peripheral surface of the same shape as the inner periphery of the duct to be formed, each template having a thickness equal to the intended axial thickness of a member and each template separator having a thickness equal to the intended axial thickness of an insulating layer. Then each member is formed by taking each template separately and wrapping a tube, from which the member is to be formed, around the periphery of the template (hereinafter referred to as an "inner template"), arranging one of a second set of annular templates around the tube, the annular template having the same thickness as the corresponding inner template and an internal periphery shaped to define the desired outer periphery of the member. Then the tube is pressed to the thickness of the inner and annular templates and is separated from at least the inner template. Then the members and annular layers of insulation of thickness corresponding to the template separators are arranged alternately end-to-end in the same order as that occupied by the corresponding inner templates and the template separators in said laminated block and the members and the annular layers of insulation are sealingly secured together.

---

The invention relates to a generating duct for a magnetohydrodynamic electrical generator (referred to hereinafter as a "MHD" generator).

Briefly, in a MHD generator, a stream of hot electrically-conductive gas is expanded through a divergent nozzle at high velocity and is passed simultaneously through a magnetic field extending transversely of the longitudinal axis of the duct. Electric currents are induced thereby in the gas and are collected by electrodes forming parts of electrode-defining annular members (hereinafter called "members," except where they are referred to in full) encircling the stream of gas.

In a MHD generator proposed hitherto, the duct is formed by sealingly securing together end-to-end a plurality of such members of which the internal peripheries also together define the divergent flow path through the duct, said members being electrically insulated from one another and each being formed from a tube bent to an appropriate annular shape and having inlet and outlet means for passing a coolant therethrough. Due to required conditions of operation, e.g., the strength of the magnetic field or the mobility of free electrons in the gas flowing through the duct, the abutting faces of the members may be required to lie in planes positioned at an angle other than a right angle to the longitudinal axis of the duct, e.g., at 45°, or they may be curved with respect to a plane extending transversely to said longitudinal axis.

Furthermore, a member need not be of constant thickness, e.g., it may be wedge-shaped, where it is desired that the angle of the abutting faces of the members with respect to the longitudinal axis of the duct should change at progressive positions along the length of the duct. These features coupled with the divergence of the duct have the effect that the majority of the members are different from one another and as they must each be of the correct size and shape, their manufacture is extremely difficult. An object of the invention is to provide an improved method of manufacturing the members and of assembling them end-to-end with interposed insulation to define the duct.

According to the invention, a method of manufacturing a generating duct for a MHD generator by sealingly securing together end-to-end alternate electrode-defining, annular, tubular members and annular layers of insulation, comprises the steps of providing a first set of templates, each having a periphery of such a shape that the templates are capable of being assembled alternately with template separators in a pack, thereby to form a laminated block having a peripheral surface of the same shape as the inner periphery of the duct to be formed, each template having a thickness equal to the intended axial thickness of a member and each template separator having a thickness equal to the intended axial thickness of an insulating layer, forming a member by taking each template separately and wrapping a tube, from which the member is to be formed, around the periphery of the template, arranging one of a second set of annular templates around the tube, the annular template having the same thickness as the corresponding template of the first set and an internal periphery shaped to define the desired outer periphery of the member, pressing the tube to the thickness of the two templates and separating the member thereby formed from at least the template of the first set, forming said annular layers of insulation, each corresponding in thickness to the appropriate template separator, assembling the members and the annular layers of insulation alternately end-to-end in the same order as that occupied by the corresponding templates of the first set and the template separators in said laminated block, and sealingly securing the members and the annular layers of insulation together.

Conveniently, each member may be permanently attached to the respective annular template, the latter thereby forming means for sealingly securing together the members and the annular layers of insulation.

Said first set of templates and the template separators may conveniently be formed by clamping together a pack of blank plates of the desired thicknesses, shaping the peripheral surface of the laminated block, which is thereby formed, to the shape of the inner periphery of the duct to be formed and then separating the templates and the template separators to enable the templates of said first set to be used separately for the formation of each member.

The invention also includes a generating duct constructed in accordance with the method set out in any of the immediately preceding three paragraphs.

The invention also includes an electrode-defining, annular member made in accordance with the method set out hereinbefore.

By way of example, a method, in accordance with the invention, of constructing a generating duct for a MHD generator will now be described with reference to the accompanying drawings, in which.

Figure 1:
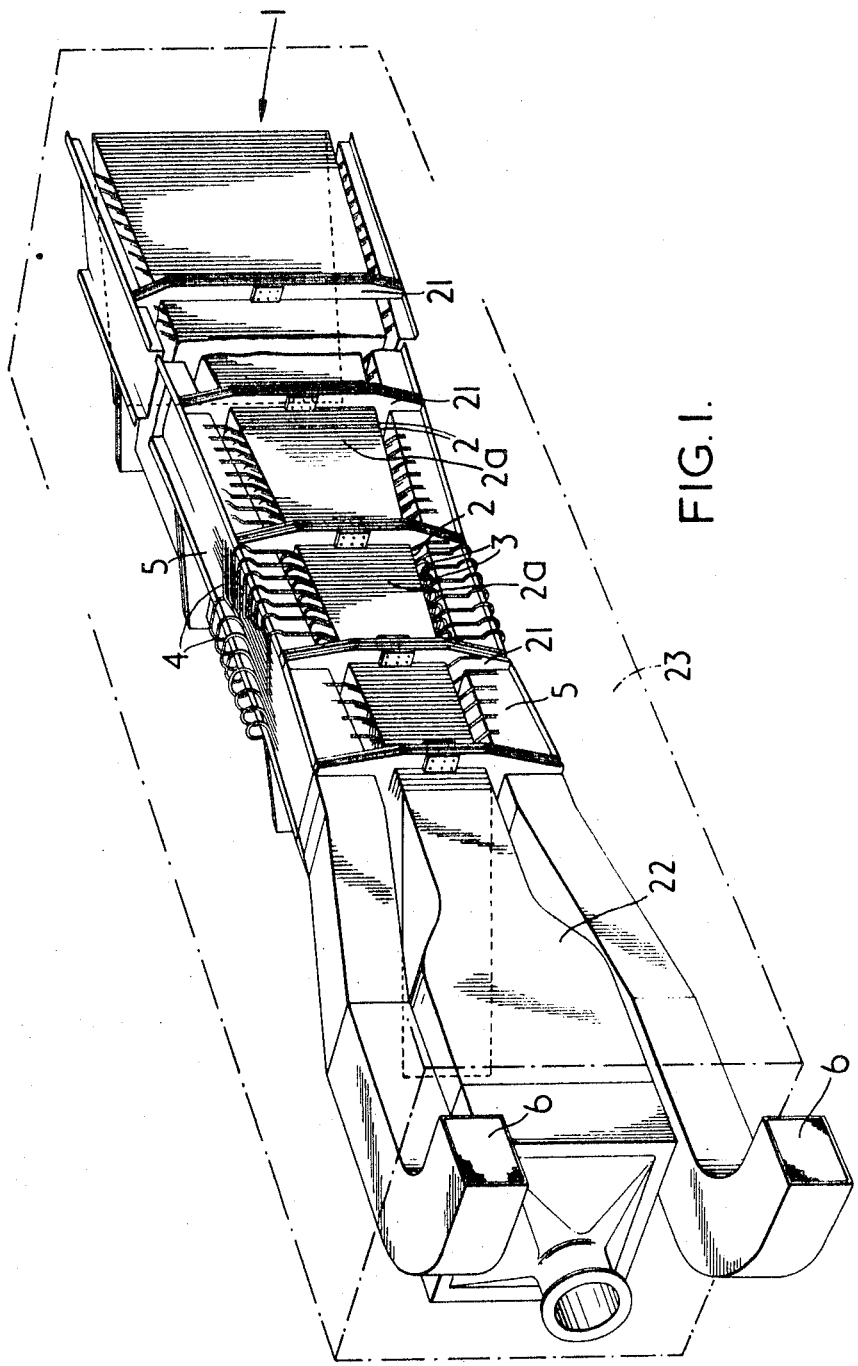
FIGURE 1 is a perspective diagram of the assembled generating duct.
Figure 4:
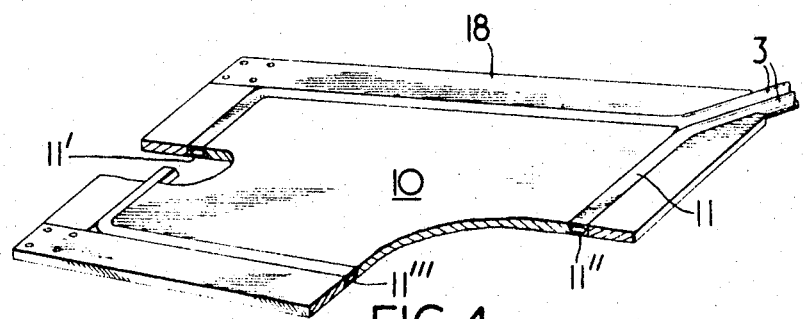
FIGURE 4 is a diagram similar to FIGURE 3 showing the next stage in the manufacture of a member.

Referring to FIGURE 1, the generating duct is in the form of a divergent nozzle 1 of rectangular cross-section formed from a large number of electrode-defining, annular members 2 arranged in abutment end-to-end alternately with thinner annular layers of insulation (not shown in FIGURE 1) and together defining a rectangular flow-path, leading from a combustion chamber indicated by reference 22. The members and the insulation layers extend in planes arranged in a plan view at an angle of 45° to the longitudinal axis of the duct. It view of this and the divergence of the duct, each member and each insulating layer is of a different trapezium shape and size as viewed in elevation. Furthermore, as each member has appreciable axial thickness, the cross-sectional shapes of each member at different positions therein also differ (See FIGURE 4). The members are each formed from circular section metal tube bent to the required trapezium shape and size and having end portions 3 extending from one corner of the trapezium and connected to conductor pipes 4, which are appropriately bent so as finally to extend parallel to the longitudinal axis of the duct and are arranged in longitudinally-extending troughs 5 positioned above and below the duct, as shown in FIGURE 1. As in known MHD generators, the generating duct is positioned within means indicated by chain lines 23 for creating a magnetic field extending transversely of the longitudinal axis of the generating duct. When hot gas flows at high velocity from the combustion chamber 22 through the generating duct 1, electric current will be induced in electrodes formed by the upright side portions 2a, as shown in FIGURE 1, of the members 2 and is collected at the upstream ends 6 of the conductor pipes 4. Liquid coolant is arranged to be circulated through the pipes 4 and the tube forming each member 2. In view of the large number of members 2, each of a different size and shape, required in the manufacture of the duct, it has been necessary to provide a method whereby they can be economically manufactured with a high degree of accuracy.

Figure 2:
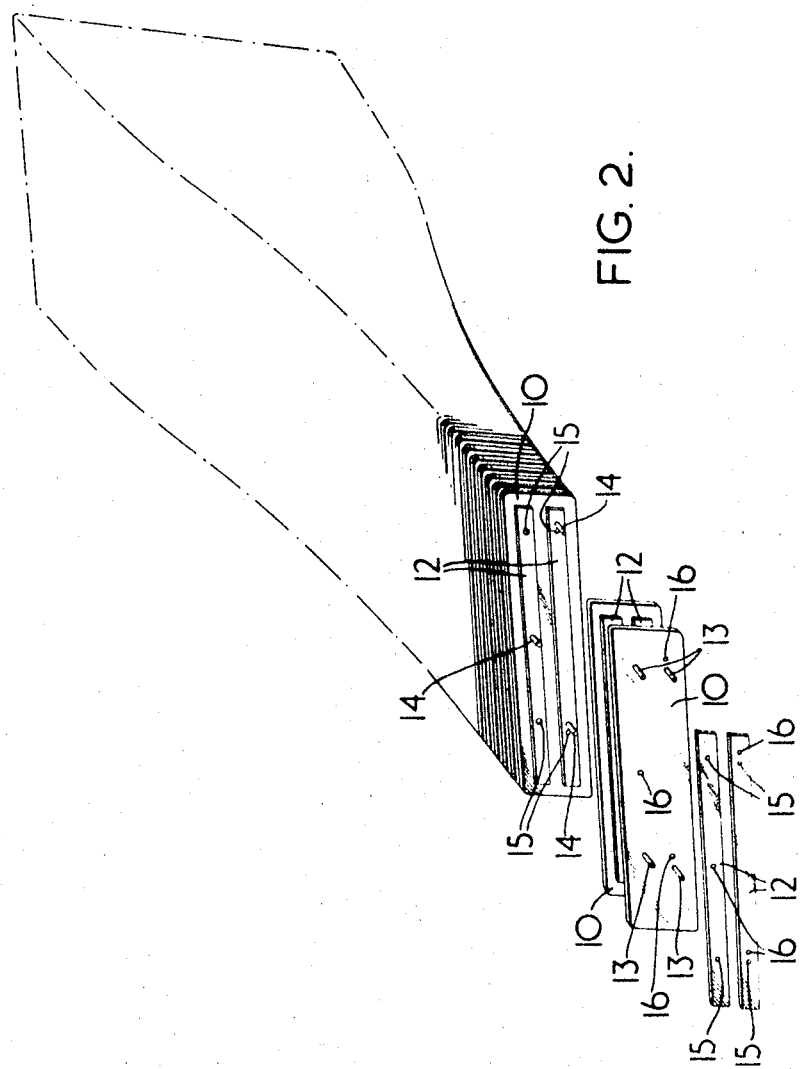
FIGURE 2 is a perspective diagram of a pack of templates by which the electrode-defining, annular members are to be formed.
Figure 3:
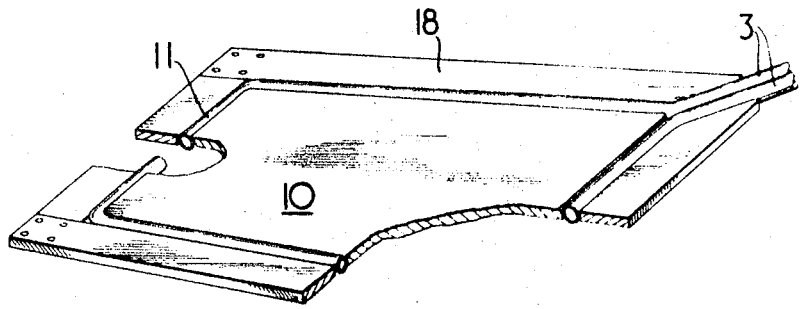
FIGURE 3 is a perspective diagram showing a stage in the manufacture of a member.
Figure 5:
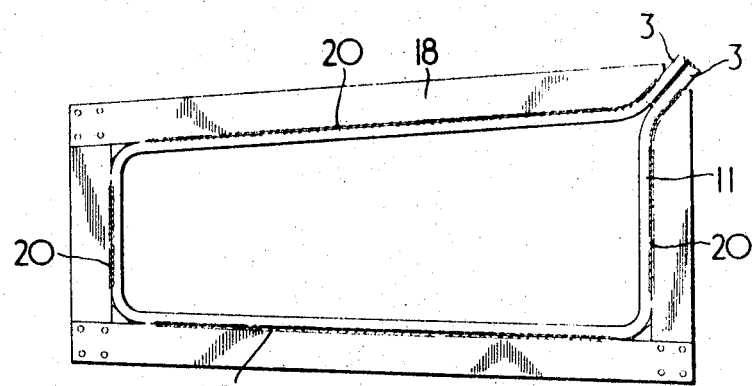
FIGURE 5 is an end view to a smaller scale of a finished member.

Each member 2 is formed from a tube 11 bent around the periphery of an internal template 10 (see FIGURES 2, 3 and 4) of the required peripheral shape and axial thickness. Each template 10 may be made separately; but a convenient method is to assemble and clamp together in a pack a plurality of flat blank plates and interposed template separators arranged at an angle of 45° to the longitudinal axis of the pack as viewed in plan, each plate having a thickness equal to that required for a member and each of the template separators having a thickness equal to that required for each layer of insulation to be provided between the members, and then to shape the assembled pack so as to form at least on the templates a peripheral surface of the same shape as that of the flow-path required for the duct. FIGURE 2 shows a pack formed from a set of templates 10 and interposed separators in the form of strips 12. In FIGURE 2 only the first few templates 10 and strips 12 adjacent the "upstream" end of the pack have been shown, the remainder of the pack being indicated in outline only. For convenience of assembly of the pack, the templates 10 are provided with dowel pins 13 or 14 engageable respectively in holes 15 or 16 in the strips 12 and in adjacent templates. After the templates have been made, they are separated, and around each template 10, a tube 11 is wrapped as shown in FIGURE 3. To enable each tube 11 to be bent around the periphery of the template 10, the tube is first filled with a filler capable of flowing under pressure and which is eventually removed from the finished member. The end portions 3 of each tube 11 are provided adjacent one corner of the template 10 from which they extend. Then an appropriately shaped outer annular template 18 of the same thickness as the template 10 is placed around the bent tube 11. The template 18 has an internal periphery of the finished shape required for the outer periphery of the tube 11. The tube 11 is then pressed to the same thickness as the templates 10 and 18 and assumes the required different cross-sectional shapes at different positions in the pressed tube 11, as shown at 11′, 11″ and 11‴ in FIGURE 4. The two end portions 3 of the tube are sealingly secured together, e.g., by welding or brazing, and the tube 11 is also similarly sealingly secured at 20 to the template 18. The template 10 is removed from within the tube 11, thereby exposing the inner periphery of the finished member. (See FIGURE 5.)

To assemble the duct, the members 2, comprising the bent and pressed tubes 11 and the annular templates 18, are arranged in the required order and a layer of insulation of the same thickness as the appropriate strips 12 is interposed between each pair of members 2. The members and the layers of insulation are sealingly clamped together by bolts (not shown) or equivalent means passed through the templates 18 and the assembled duct is supported at intervals in its length in apertured plates 21, which also locate the troughs 5, as shown in FIGURE 1.

What I claim as my invention and desire to secure by Letters Patent of the United States is:

1. A method of manufacturing a generator duct for a magnetohydrodynamic (MHD) generator by sealingly securing together end-to-end alternate electrode-defining, annular, tubular members and annular layers of insulation and comprising the steps of providing a first set of templates, each having a periphery of such a shape that the templates are capable of being assembled alternately with template separators in a pack, thereby to form a laminated block having a peripheral surface of the same shape as the inner periphery of the duct to be formed, each template having a thickness equal to the intended axial thickness of a member and each template separator having a thickness equal to the intended axial thickness of an insulating layer, forming a member by taking each template separately and wrapping a tube, from which the member is to be formed, around the periphery of the template, arranging one of a second set of annular templates around the tube, the annular template having the same thickness as the corresponding template of the first set and an internal periphery shaped to define the desired outer periphery of the member, pressing the tube to the thickness of the two templates and separating the member thereby formed from at least the template of the first set, forming said annular layers of insulation, each corresponding in thickness to the appropriate template separator, assembling the members and the annular layers of insulation alternately end-to-end in the same order as that occupied by the corresponding templates of the first set and the template separators in said laminated blocks, and sealingly securing the members and the annular layers of insulation together.

2. The method according to claim 1 in which each member is permanently secured to the respective annular template, the latter thereby forming means for sealingly securing together the members and the annular layers of insulation.

3. The method according to claim 1 in which said first set of templates and the template separators are formed by clamping together a pack of blank plates of the required thicknesses, shaping the peripheral surface of the laminated block, which is thereby formed, to the shape of the inner periphery of the duct to be formed and then separating the templates and the template separators to enable the templates of said first set to be used separately for the formation of each member.

4. A generating duct manufactured by the method according to claim 1.

5. An electrode-defining, annular, tubular member for the generating duct manufactured by the method according to claim 1.

6. An electrode-defining, annular, tubular member for the generating duct manufactured by the method according to claim 2 in which the member has the respective annular template permanently secured thereto.

References Cited

UNITED STATES PATENTS 3,234,630  2/1966  Kenyon _____ 29—592
3,374,368  3/1968  Swift-Hook _____ 310—11

DAVID X. SLINEY, Primary Examiner